US008195157B2

(12) United States Patent
Rossetti et al.

(10) Patent No.: US 8,195,157 B2
(45) Date of Patent: Jun. 5, 2012

(54) METHOD OF PROVIDING ROUTE UPDATE MESSAGES AND PROVIDING MESSAGES TO ACCESS TERMINALS

(75) Inventors: David Albert Rossetti, Randolph, NJ (US); Yang Yang, Morris Plains, NJ (US); Sigen Ye, Randolph, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 1054 days.

(21) Appl. No.: 11/623,446

(22) Filed: Jan. 16, 2007

(65) Prior Publication Data

US 2008/0170543 A1 Jul. 17, 2008

(51) Int. Cl.
*H04W 4/00* (2009.01)
(52) U.S. Cl. ............... 455/435.1; 455/456.1; 455/414.2; 455/458; 455/466; 379/329
(58) Field of Classification Search .................. 455/466, 455/435.1, 456.1, 414.2, 446, 458; 370/329
See application file for complete search history.

(56) References Cited

U.S. PATENT DOCUMENTS

| 6,510,146 | B1 * | 1/2003 | Korpela et al. ............... 370/332 |
| 2001/0034232 | A1 * | 10/2001 | Kuwahara ..................... 455/435 |
| 2006/0056351 | A1 * | 3/2006 | Wall ............................. 370/331 |
| 2006/0223508 | A1 * | 10/2006 | Starr et al. ................. 455/414.2 |

FOREIGN PATENT DOCUMENTS

| DE | 43 16 091 A1 | 11/1994 |
| WO | WO 2007/127093 A1 | 11/2007 |

OTHER PUBLICATIONS

International Search Report and Written Opinion mailed Jun. 20, 2008.
Yeung et al., *A Comparative Study on Location Tracking Strategies in Cellular Mobile Radio Systems*, 1995 IEEE pp. 22-28.

* cited by examiner

*Primary Examiner* — Justin Lee
(74) *Attorney, Agent, or Firm* — Williams, Morgan & Amerson, P.C.

(57) ABSTRACT

The present invention provides a method including providing at least one route update message based upon at least one sector list associated with an access terminal. The sector lists are formed based on information collected by the access terminal.

24 Claims, 6 Drawing Sheets

METHOD OF PROVIDING ROUTE UPDATE MESSAGES AND PROVIDING MESSAGES TO ACCESS TERMINALS

CROSS REFERENCE TO RELATED APPLICATIONS

This application is related to U.S. patent application Ser. No. 11/409,491 filed on Apr. 16, 2006.

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of cells, which may be grouped into one or more networks. Access terminals located in each cell may access the wireless communications system by establishing a wireless communication link, often referred to as an air interface, with a base station (or access network) associated with the cell. The access terminals may include devices such as mobile telephones, personal data assistants, smart phones, Global Positioning System devices, wireless network interface cards, desktop or laptop computers, and the like. As an access terminal moves between cells in the wireless communication system, the access terminal may periodically provide route update messages (also known as location update messages) that inform the wireless communication system of the access terminal's current location. Due to the mobility of the access terminal, the location of the cell where the most recent route update message was received is used to estimate the current location of the access terminal.

In some activity states, such as the idle or dormant mode, the access terminal may stop sending route update messages even though it may continue to move through the cells in the wireless communication system, until some condition is met (e.g., when the access terminal crosses the boundary of the sub-net associated with the last route update message, a new location update with the new sub-net is sent). Accordingly, the wireless communication system may not know which cell contains the access terminal when information becomes available for delivery to the access terminal. A wireless communication system may then attempt to reach the access terminal by sending paging messages over a plurality of cells belonging to a paging area determined by the network based on the information it has about the last known access terminal location, e.g., over the cells belonging to the last known sub-net. The paging messages contain information that indicates to the access terminal that information is available for transmission to the access terminal. If the access terminal receives the paging message, it may provide a paging response to a base station of a cell. The paging response typically indicates that the access terminal is available to receive the information and may also provide information indicating how to route the information to the access terminal.

Both the paging messages and the route update messages represent system overhead. Accordingly, the wireless communication system is generally designed to meet two conflicting objectives: reducing the overhead from the paging load and reducing the number of route update messages transmitted by the access terminal. The paging load is typically minimized when the location of the access terminal is known with relatively high accuracy so that each paging message can be transmitted to a relatively smaller number of cells. However, increasing the accuracy of the location of the access terminal requires transmitting a larger number of route update messages during a given period. In contrast, reducing the number of route update messages transmitted by the access terminal may reduce the accuracy of the access terminal location estimation by the wireless communication system, which typically results in each paging message being transmitted to a relatively large number of cells. For example, when delay of page response is of concern, a large number of cells may be paged during a first attempt to locate the mobile unit to achieve a high success rate for first-time-pages.

The conventional solution to this problem is to define subnets that include the cells serviced by a plurality of base stations. The access terminals may transmit route update messages when they cross from one sub-net to another sub-net. The wireless communication system may begin the paging process by providing paging messages via the base stations in the sub-net indicated by the most recently received route update message. For example, the geographic area served by the wireless communication system may be divided up into multiple sub-nets that encompass the cells serviced by groups of 10 base stations. Access terminals in the wireless communication system may then provide location updates when they cross a cell boundary between the groups of 10 base stations and the wireless communication system may provide paging messages via the groups of 10 base stations in the sub-nets.

However, the number of users and the geographical area served by wireless communication systems is increasing, which often results in an increase in the size and number of cells in a typical sub-net. Since conventional route update messages are triggered by crossing a sub-net boundary, access terminals may travel through numerous cells without providing any route update messages to the wireless communication system. Consequently, the wireless communication system may be required to provide paging messages to a large (and likely increasing) number of cells in order to locate the access terminal. The wireless communication system may therefore have to devote a larger percentage of system resources to supporting overhead associated with providing paging messages to large numbers of cells in the sub-nets.

One technique for reducing the number of cells that are paged is called radius-based paging. Radius-based paging techniques force the access terminal to provide a route update message when it travels a distance larger than a predetermined radius from a center of the cell where the access terminal was last seen. Alternatively, the access terminal may provide a route update message when it travels a distance larger than a predetermined radius from a group of cells covered by a radio network controller associated with the access terminal. The wireless communication system may then page the access terminal by providing a paging message to the cell where the access terminal was last seen. If the access terminal does not respond to this paging message, the wireless communication system may page the cells in the area defined by the predetermined radius. Paging messages may be provided to cells in increasingly large areas (indicated by increasingly large radii) if the access terminal fails to reply to a previous paging message.

Although radius-based paging may be preferable to subnet-based paging when the subnets include a large number of cells, radius-based paging still has a number of drawbacks. The system overhead associated with providing paging messages to all of the cells within the predetermined radius may consume a large percentage of the resources of the wireless communication system. The number of cells within a predetermined radius may be reduced by decreasing the radius, but this will result in an increase in the frequency of transmitting route update messages by the access terminal. Consequently, the system overhead associated with providing the route update messages may increase and consume a larger percentage of the resources of the wireless communication system. Power consumption by the access terminal may also be increased when the number of route update messages increases. Furthermore, relatively long paging delays may be experienced as the wireless communication system attempts to locate the access terminal in cells at increasing distances from the cell where the access terminal was last seen.

Efforts have been made to improve the access networks ability to locate an access terminal by performing intelligent paging from the access network side, e.g., in CDMA2000 1x systems. In the proposed techniques for intelligent paging, the access network uses the route update messages and the paging response provided by each access terminal to form a statistical representation of the travels of the access terminal. A centralized database is built to store the travel statistics of all the access terminals in the system. However, as discussed above, access terminals do not send route update messages from every cell or sector visited by the access terminal. Consequently, the statistical representation formed by the access network typically contains "holes," i.e., cells or sectors that are not in the access network's database because the access terminal has rarely or never transmitted a route update message from these cells or sectors. Therefore, the statistics collected at the access network are not accurate, and it may take long time for the network to build up the statistics for all the access terminals. Furthermore, the accuracy of the statistical representation typically falls with increasing radius or number of cells within a subnet.

Intelligent paging from the access network side is also very difficult to implement in systems that assign UATIs to the access terminals because the UATI assigned by an access network can be changed after the access terminal moves out of and into to a sub-net. Thus, it is difficult to maintain the association of the statistical information with the access terminal as it travels in and out of different subnets. Furthermore, the centralized global data base required by the access network side approach is burdensome and the requirements of the centralized global database may conflict with the requirements of a flat network architecture. For example, in a flat network, the centralized approach may cause an increase in the complexity of the network and an increase in backhaul traffic to support the centralized database.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided that includes providing at least one route update message based upon at least one sector list associated with an access terminal. The sector lists are formed based on information collected by the access terminal. In another embodiment, a method is provided that includes receiving information indicative of at least one sector list formed by an access terminal. The sector lists are formed based on information collected by the access terminal. In yet another embodiment, a method is provided that includes providing at least one paging message to at least one sector in at least one sector list formed by an access terminal. The sector list is formed based on information collected by the access terminal.

BRIEF DESCRIPTION OF THE DRAWINGS

The invention may be understood by reference to the following description taken in conjunction with the accompanying drawings, in which like reference numerals identify like elements, and in which.

Figure 1:
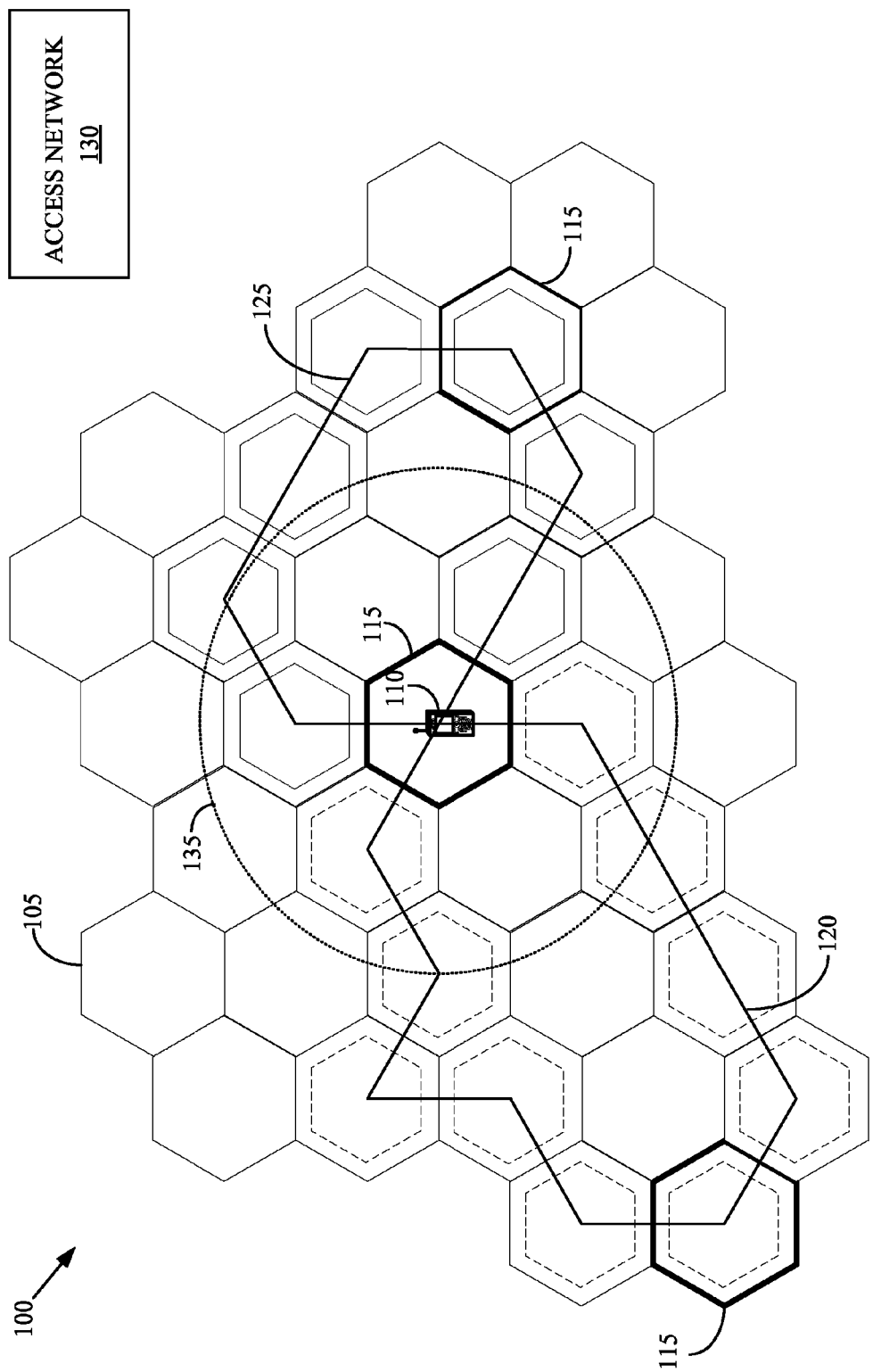
FIG. 1 conceptually illustrates a first exemplary embodiment of a wireless communication system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result.

The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the first exemplary embodiment, the wireless communication system 100 is configured to provide wireless connectivity to a plurality of geographic areas or cells 105 (only one indicated by the numeral 105). In the first exemplary embodiment, each cell 105 corresponds to a single sector. However, in alternative embodiments, each cell 105 may be divided up into a plurality of sectors, e.g. the cell 105 may include three sectors that are served by different antennas. Thus, the term "sector" will be understood to refer to a cell 105 or a selected portion of the cell 105. The wireless connectivity may be provided according to one or more standards or protocols such as the Universal Mobile Telecommunication System (UMTS), the Global System for Mobile communications (GSM), Code Division Multiple Access (CDMA, CDMA 2000), and the like. However, the particular standards, protocols, or combinations thereof are matters of design choice and not material to the present invention. Persons of ordinary skill in the art having benefit of the present disclosure should also appreciate that base stations, base station routers, and the like may be used to provide a wireless connectivity to the cells 105, although in the interest of clarity these devices are not shown in FIG. 1.

An access terminal 110 is deployed within the wireless communication system 100, which may provide wireless connectivity to the access terminal 110. Although a single access terminal 110 is shown in FIG. 1, persons of ordinary skill in the art having benefit of the present disclosure should appreciate that any number of access terminals 110 may be deployed in the wireless communication system 100. Persons of ordinary skill in the art should also appreciate that the access terminal 110 may also be referred to using terms such as "mobile unit," "mobile station," "user equipment," "subscriber station," "subscriber terminal," and the like. Exemplary access terminals 110 include, but are not limited to, cellular telephones, personal data assistants, smart phones, pagers, text messaging devices, global positioning devices, network interface cards, notebook computers, and desktop computers. Techniques for configuring and/or operating the access terminal 110 are known in the art and in the interest of clarity only those aspects of configuring and/or operating the access terminal 110 that are relevant to the present invention will be discussed further herein.

One or more access networks 130 may be deployed within the wireless communication system 100. Although a single access network 130 is shown in FIG. 1, persons of ordinary skill in the art having benefit of the present disclosure should appreciate that any number of access networks 130 may be deployed in the wireless communication system 100. Persons of ordinary skill in the art should also appreciate that the present invention is not limited to wireless communication systems that include access networks 130. In alternative embodiments, the wireless communication system may include other devices (such as radio network controllers) for connecting the cells to the wireless communication system 100. Techniques for configuring and/or operating the access networks 130 are known in the art and in the interest of clarity only those aspects of configuring and/or operating the access network 130 that are relevant to the present invention will be discussed further herein.

Access terminals 110 may repeatedly visit the same (or similar) sets of cells or sectors 105. For example, a particular user may leave home almost every Saturday morning and travel to the same soccer field, the same grocery store, the same restaurant or group of restaurants, one or more of a group of clothing stores, and then return home Saturday afternoon. For another example, policemen, delivery trucks, mailmen, and the like may travel along approximately the same routes on a regular basis. The access terminal 110 may be configured to collect information that may be used to form one or more sector lists that indicate sectors that may be likely to include the access terminal 110. The collected information may include information indicating the sectors 105 that were visited by the access terminal 110 during a selected period of time, the cells 105 that were visited by the access terminal 110 after leaving a selected cell or sector 105 and prior to arriving at another selected cell 105, the amount of time spent in one or more of the cells 105, a percentage of a selected time period that was spent in a selected cell 105, and the like.

One or more cell or sector lists may be determined based upon the information collected by the access terminal 110. In the first exemplary embodiment, the sector lists is determined by the access terminal 110. However, in alternative embodiments that will be discussed herein, the sector lists may be determined by another entity, such as the access network 130, using the information collected by the access terminal 110. The sector lists may include lists of cells or sectors 105 where the access terminal 110 is expected to spend relatively large portions of time. These cells or sectors 105 may be referred to as stationary or primary cells 115 (as indicated by the bold-lined hexagons) and the sector lists including the stationary cells 115 may be referred to as stationary sector lists or stationary patterns. Examples of stationary or primary sectors 115 may include the cell or sector 115 that provides wireless connectivity to the access terminal 110 when it is located in the user's home, workplace, or other location where the user may spend a large fraction of time such as the soccer field, the grocery store, the restaurants, and the clothing stores that are typically visited by the user of the access terminal 110.

The sector lists may also include lists of cells or sectors 105 visited by the access terminal 110 as the access terminal travels through a coverage area of the wireless communication system 100. These sector lists may be referred to as dynamic sector lists or travel route patterns. As used herein, the terms "dynamic sector lists" and/or "travel pattern" and/or "travel route pattern" or "route pattern" will be understood to refer to one or more cells 105 that are selected based upon a usage pattern associated with the access terminal 110. In one embodiment, a dynamic sector list may include cells or sectors 105 that are also included in one or more stationary sector lists. For example, a travel route pattern may include cells 105 that are likely to be visited by the access terminal 110 as it travels from one primary cell 115, to one or more other cells or sectors 105, and another primary cell 115 or back to the original primary cell 115. A travel route pattern may also include cells 105 that are likely to be visited by the access terminal 110 as the access terminal 110 travels between two or more primary cells 115. Thus, one travel route pattern associated with the access terminal 110 may include the cells 115 and 105 that provide wireless connectivity to areas that on the route between the primary cells 115. One travel route pattern example could include the primary cells that cover the major locations where the user often visits and spends a relatively long time such as home, office, and the cells that cover the major route(s) between home and office. Another example could be a list of the cells on a typical route of trip: home, major shopping center, the soccer field etc., then back to home. This travel pattern includes all the cells on the major route of this typical trip of the user of the access terminal 110 on a Saturday afternoon.

Each access terminal 110 may be associated with numerous sector lists. In the illustrated embodiment, the wireless communication system 100 includes three stationary cells 115, which may be included in a stationary sector lists associated with the access terminal 110. Furthermore, the access terminal 110 may on some occasions travel along a route 120 that may pass through a number of cells 105. Accordingly, the access terminal 110 may determine that a subset of the cells 105 (indicated by dashed hexagons) should be grouped into a travel pattern that includes the cells 105 that are likely to be visited by the access terminal 110 when traveling along the route 120. Similarly, the access terminal 110 may on other occasions travel along another route 125 and may therefore assign one or more of the cells 105 (indicated by dotted hexagons) as belonging to another travel pattern. The determined travel route patterns may be stored in the access terminal 110 and/or provided to the access network 130. Techniques for determining the cells 105 that are included in the travel patterns will be discussed in more detail below.

The access terminal 110 is also configured to determine a likelihood that it is in a stationary or primary cell 115 and/or currently traveling along a route that may be associated with one or more of the determined travel patterns. For example, the access terminal 110 may determine that it is currently in one of the cells 105 in the travel pattern associated with the route 120, e.g., by comparing the current and/or previously visited cells to a stored travel pattern. The access terminal 110 may also determine that, since leaving the primary cell 115, it has visited a number of other cells 105 in the travel pattern associated with the route 120. Accordingly, the access terminal 110 determine that it is very likely that it is traveling along the route 120 or a similar route that may result in the access terminal 110 being present in one of the cells 105 associated with the travel pattern.

The access terminal 110 may determine whether or not to provide a route update message based on the cell or sector lists associated with the access terminal 110. As used herein, the term "route update message" will be understood to refer to any message that includes information that may be used to determine a location of the access terminal 110. In one embodiment, the access terminal 110 may not provide route update messages as long as it remains within one of the cells 105 associated with a sector list, e.g., a stationary sector list and/or a travel pattern associated with a route 120, 125. For example, the access terminal 110 may provide a route update message whenever it moves outside a circle 135 defined by a predetermined radius from the center of the primary cell 115. However, as long as the access terminal remains in one of the cells 105 in the travel pattern associated with the route 120, the access terminal 110 may not provide any route update messages. If the access terminal 110 enters a cell 105 that is not in the travel pattern associated with the route 120, the access terminal 110 may then provide a route update message to the access network 130.

The access terminal 110 may be paged using information indicative of the sector lists associated with the access terminal 110. In one embodiment, a database including the cells in the sector lists associated with each access terminal 110 is stored in the access network 130. For example, the database may be formed using information provided by the access terminal 110 when it collects information associated with the sector lists and/or determines one or more of the sector lists. In one embodiment, the access network 130 may maintain a data base to store the per-user-based preferred cells/sectors lists for paging. The data base could be centralized in a single entity within the access network 130 or distributed through a hierarchical network or flat network. In a flat network, the per-user-based database (including the paging pattern groups and any possible intermediate data) could be tied to a session associated with the access terminal 110. In one embodiment the information associated with each user session may stay in the base station that supports the session and paging manager. The per-user-based data base could be moved together with session and paging manager when the session is transferred or handed over.

The access terminal 110 may also provide information indicating that it is currently in a stationary cell 115 and/or traveling along a route that may be associated with one or more of the known travel patterns 120, 125. For example, the access terminal 110 may send a message, such as a route update message, that includes an identification number indicating the current travel pattern. The access network 130 may then use the information indicative of the current travel pattern associated with the access terminal 110 to send a paging message via the cells 105 in the travel pattern.

Figure 2:
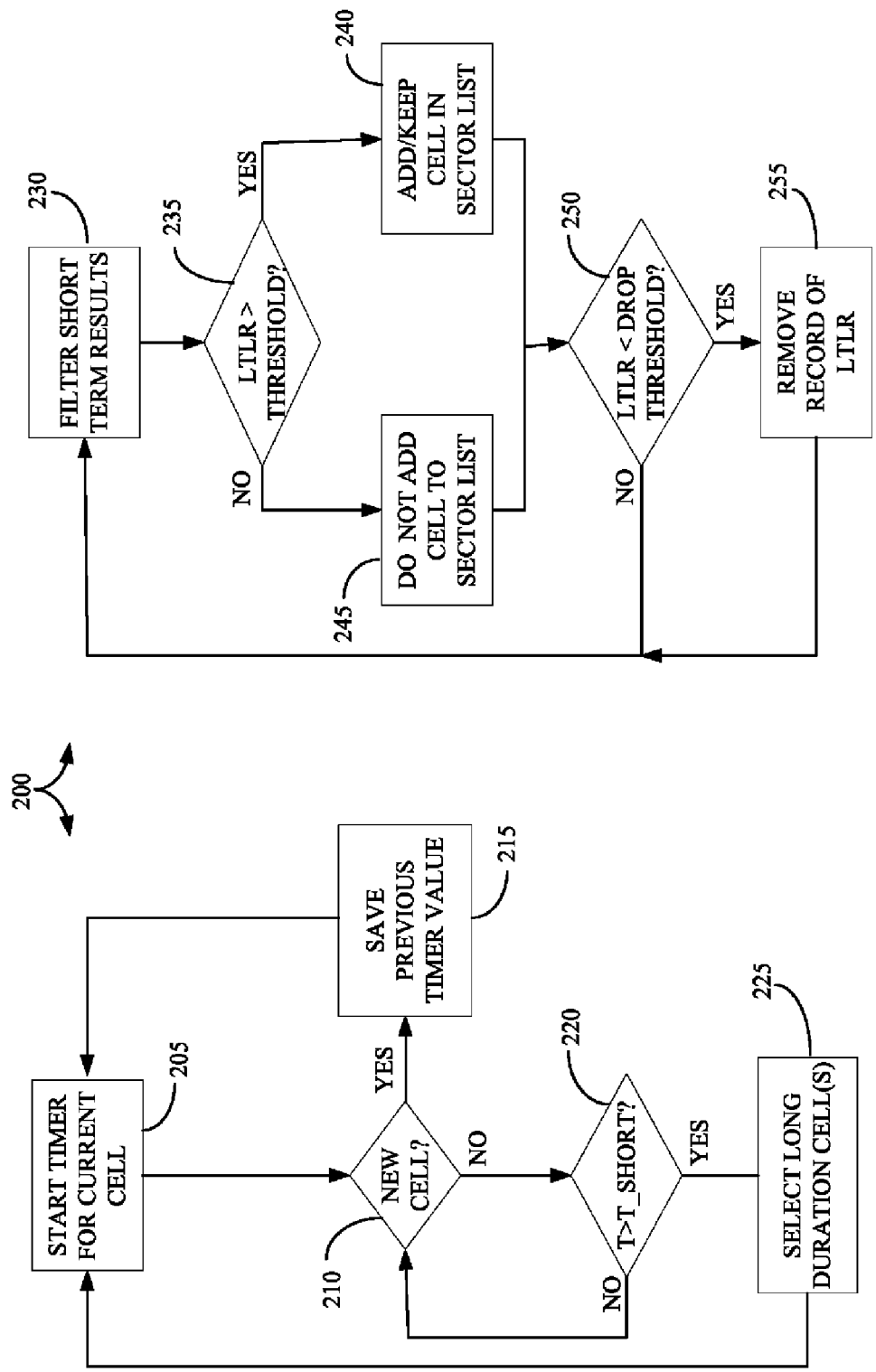
FIGS. 2A and 2B conceptually illustrate one exemplary embodiment of a method for determining stationary and/or primary sector lists based on information collected by an access terminal, in accordance with one embodiment of the present invention.

FIGS. 2A and 2B conceptually illustrate one exemplary embodiment of a method 200 for determining stationary and/or primary sector lists based on information collected by an access terminal. Users typically spend a relatively large percentage of time in their home, their office, a few favorite stores, restaurants, schools and other points of interest that are covered by a limited number of cells or sectors that are referred to herein as stationary sectors. Over a given period of time, an access terminal is more likely to be in one of the stationary sectors than in a random sector within a given radius of a reference sector, such as a primary sector. Therefore, pages sent to the sectors in the stationary pattern associated with an access terminal are more likely to reach the access terminal, relative to a conventional radius-based paging strategy. Moreover, since each access terminal is capable of collecting more (and more accurate) location information than an access network, particularly when the access terminal is in the idle state, the access terminal is a preferable location for collecting the information used to form the preferred list of stationary cells or sectors.

In the illustrated embodiment, a cell or sector may be included in a group of stationary cells when the access terminal spends an accumulated time duration (or percentage of time) within the cell over a given period time. For example, a long term likelihood ratio (LTLR) that indicates the likelihood that the access terminal will be found in a particular cell may be defined as:

$$\text{Long\_term\_likelihood\_ratio\_cell\_}i=\text{Accumulated\_duration\_in cell\_}i/\text{Long\_term\_avg\_period}$$

The access terminal (AT) may therefore start (at 205) a timer for the current cell and accumulate the duration that the AT remains in the current cell. If the access terminal determines (at 210) that it has encountered a new cell, then the access terminal may save (at 215) the timer value associated with the previous cell and then start (at 205) a timer for the current (new) cell. As long as the access terminal determines (at 210) that it has not encountered a new cell, then the timer may continue to run.

The values for the durations associated with each of the cells encounter by the access terminal may be collected over a selected period of time. For example, the durations associated with each of the cells may be collected for a time indicated by the parameter Short_update_period, e.g. daily or over every 24 hours. As long as the period of time for collecting the values of the durations is determined (at 220) to be less than the Short_update_period (T_short), the access terminal may continue to collect durations associated with each cell encountered by the access terminal. Once the time period for collecting the values of the durations is determined (at 220) to exceed the value of the parameter Short_update_period, the access terminal may select (at 225) one or more cells that have a relatively long duration. For example the access terminal may select (at 225) one or more of the sectors when the Accumulated_duration_cell_i is greater than or equal to a threshold that is referred to herein as the Short_term_stationary_duration_threshold. The particular value of the threshold is a matter of design choice and not material to the present invention.

Short-term likelihoods that indicate the likelihood that the access terminal was in each encountered cell during a period of time in which the durations were collected may also be determined. For example, the short-term likelihoods may be defined for each cell as the ratio of the accumulated time spent in each cell to the period of time designated for collecting this information, e.g. Short_term_likelihood_ratio_cell_i=Accumulated_duration_cell_i÷Short_update_period (e.g. 24 hrs). The short-term likelihoods may then be used to determine long-term likelihoods that the access terminal may be found in one or more of the selected cells, as shown in FIG. 2B. In the illustrated embodiment, the short-term likelihoods may be filtered (at 230) to determine a long-term likelihood that the access terminal may be found in the associated cell or sector. For example, a long-term likelihood ratio for each cell may be determined (at 230) using a filtering function:

$$\text{Long\_term\_likelihood\_ratio\_cell\_}i=\text{Filter}(\text{Short\_term\_likelihood\_ratio\_cell\_}i).$$

The filter period, Long_term_avg_period, could be specified by access network, which may provide this information to the access terminal. For example, the access network may set this parameter to 10 days and provide a message containing this information to the access terminal.

Sectors may then be added to the sector list, removed from the sector list, or kept on the sector list based upon the long-term likelihood ratio (LTLR) associated with the sector. For example, if it is determined (at 235) that Long_term_likelihood_ratio_cell_i>=Stationary_pattern_threshold for a given cell, then the cell may be added to or kept in (at 240) the stationary sector list associated with the access terminal. However, if it is determined (at 235) that Long_term_likelihood_ratio_cell_i<Stationary_pattern_threshold for a given cell, then the cell may be removed (at 245) from the stationary sector list (or, in the case that this cell was not in the list to begin with, not added to the stationary sector list). In one embodiment, if a value for the Long_term_likelihood_ratio_cell_i exists, e.g. in a data base, but there is currently no value of the Short_term_likelihood_ratio_cell_i, then a value of 0 may be input to the long term filter to determine (at 230) the Long_term_likelihood_ratio_cell_i. If it is determined (at 250) that the Long_term_likelihood_ratio_cell_i<Drop_threshold, then the record of the Long_term_likelihood_ratio_cell_i may be removed (at 255). In one embodiment, the determination of any potential modifications to the stationary sector list may be conducted once every Short_update_period.

The various parameters used to add and/or remove sectors from a stationary sector list may be negotiated by the access terminal and the access network. For example, the access network could negotiate the Short_update_period, Short_term_stationary_duration_threshold, Long_term_avg_period, Stationary_pattern_threshold, and Drop_threshold with the access terminal via attributes. Furthermore, portions of the method 200 may be implemented at the access terminal and/or the access network. For example, the actions depicted in FIG. 2A may be performed at the access terminal, which may then provide the collected information, such as a list including <cell ID i, Short_term_likelihood_ratio_cell_i> for each of the cells or sectors selected (at 225), to the access network. The access network may then determine the stationary sector list as indicated in FIG. 2B and maintain a data base including the stationary sector list and/or the intermediate results provided by the access terminal. Alternatively, the access terminal may collect the information and determine the stationary sector list as indicated in FIGS. 2A and 2B. The access terminal may then provide information indicating the stationary sector list to the access network. For example, the access terminal may provide information that may be used to update the stationary sector list, such as the complete list of cells in the stationary sector list and/or cells that have been recently added or removed from the stationary sector list. In one embodiment, the access terminal may conduct the update when there are new cells to be added to the stationary sector list or there are cells to be removed from the stationary sector list.

In one embodiment, a subset of the sectors in the stationary sector list may be designated as primary cells or sectors. The primary sectors may be compiled into one or more primary sector lists, which may be considered as a particular type of stationary sector list. The list of primary cells or sectors may be identified by the access terminal and stored in the access terminal. For example, primary cell IDs could be identified based on the address of user's primary stops covered by the cell. The primary cells may include the cells that cover the user's primary stops, such as home, working office(s), major shopping center(s), and the like. In one embodiment, the primary cell IDs could be pre-specified and/or negotiated between the access terminal and the access network during the initial call registration. Alternatively, the list of primary cells may be determined by statistics in a manner similar to the technique of method 200. For example, a cell may be designated as a primary cell if the long-term likelihood ratio associated with that cell exceeds a threshold value associated with primary cells or sectors, i.e. the sector may be a primary sector if Long_term_likelihood_ratio_cell_i>=Primary_cell_threshold Values of the parameter Primary_cell_threshold may be negotiated between the access network and the access terminals via an attribute.

Figure 3:
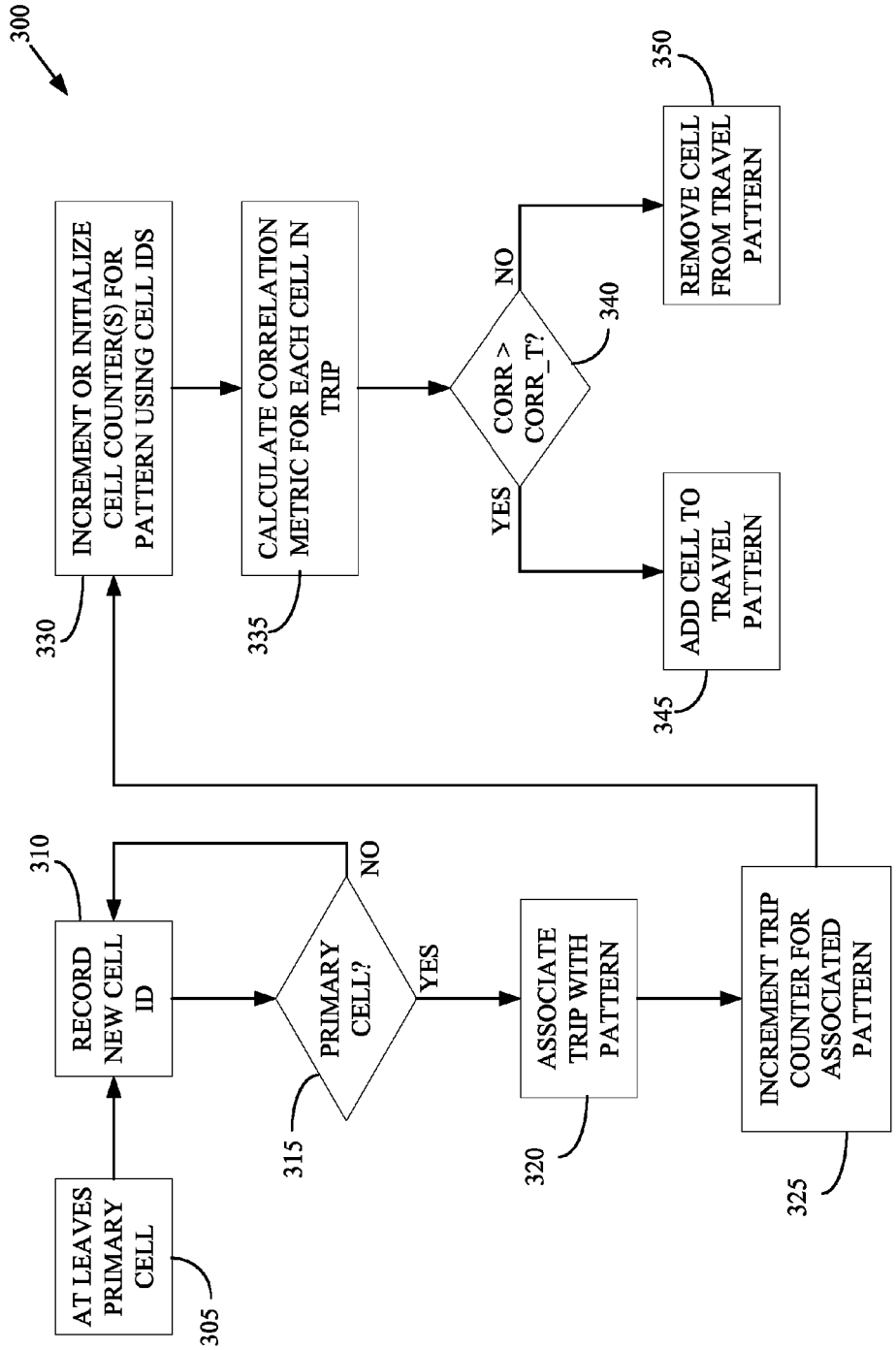
FIG. 3 conceptually illustrates one exemplary embodiment of a method for determining travel patterns associated with an access terminal, in accordance with one embodiment of the present invention.

FIG. 3 conceptually illustrates one exemplary embodiment of a method 300 for determining travel patterns associated with an access terminal. In the illustrated embodiment, the travel patterns (which may also be referred to as the dynamic patterns or dynamic cell or sector lists) are determined using information collected by the access terminal that indicates the cells or sectors that were visited by the access terminal during a trip. Trips are defined herein as the sequence of cells or sectors visited after an access terminal leaves one primary cell or sector and therefore the access terminal arrives at another primary cell or sector. The originating and destination primary sectors may be the same (i.e., the trip may be a round-trip) or different (i.e., the trip may be a one-way trip). However, persons of ordinary skill in the art having benefit of the present disclosure should appreciate that other criteria for determining the cells that may be included in a dynamic sector list or travel pattern may be used. In one embodiment, several travel patterns represented by groups of cell IDs could be created in each access terminal. The travel patterns may be determined statistically, as will be described in detail below, or they may be predetermined. For example, a travel pattern associated with a police patrol route could be predetermined and communicated to both the access network and the associated access terminal. Thus, cell IDs associated with the police patrol route travel pattern may be identified and stored at both the access network and access terminal.

The access terminal may also collect information that may be used (by the access terminal and/or by the access network) to determine one or more travel patterns. In one embodiment, the access terminal may build up at least one travel-route-pattern group which contains N (e.g. 10) cells that are determined to be the cells that are most frequently encountered by the access terminal when the user travels. A trip counter and the cell-appearance-counters for all the cells encountered by the AT during a trip may be maintained at the AT. A limit could be posted on the number of primary cells to be supported such that the number of patterns to be supported at an AT is controllable and scalable. The collected information and/or parameters used to determine the travel patterns may be represented as a number of parameters. In the illustrated embodiment, the following parameters may be defined, determined, and/or negotiated by the access terminal and/or the access network:

N_cell_i_pattern_j: the accumulated number of times of cell i is encountered by the access terminal for trip pattern j. The cell i is identified by its cell ID.

N_trip_pattern_j: the total accumulated number of trips of the access terminal for trip pattern j. The values for the counter may be stored at the access terminal for every supported travel pattern.

Max_mum_trips: when a trip counter of pattern j is hits this number, this trip counter (N_trip_pattern_j) and all the cell-encountered counters associated with pattern j (N_cell_i_pattern_j) may be reset following one or more predetermined rules.

Correlation_cell_i_pattern_j: the correlation metric of cell i to pattern j. In the illustrated embodiment, this parameter is defined as N_cell_i_pattern_j÷N_trip_pattern_j and is presented as a percentage number (x %). The value of the correlation metric should be maintained at the access terminal for every cell in a travel pattern and for all the statistic based travel patterns supported at the access terminal.

Correlation_thresh: it is a percentage value. A cell will be included in pattern j if its correlation metric to pattern j is greater than the Correlation_thresh. Otherwise, it may be removed from the travel pattern j after certain period of time.

Pattern_maturity_thresh: this parameter is represented in number of trips. This parameter specifies after how many trips a pattern that has been built up at the access terminal is considered to be mature enough for use.

In the illustrated embodiment, the method 200 begins when the access terminal leaves (at 305) the primary cell that currently includes the access terminal. After the access terminal moves out of the primary cell, it records (at 310) information that indicates the cells or sectors that are visited by the access terminal, such as cell IDs of the cells that the access terminal has encountered. The access terminal may only record the cell ID once no matter how many times the access terminal visits the cell when after it leaves the primary cell. As the access terminal enters new cells along a trip and records (at 310) the cell IDs of the visited cells or sectors, the access terminal also determines (at 315) whether the new sector is a primary cell or sector. If the access terminal determines (at 315) that the new sector is not a primary sector, then the access terminal continues to record (at 310) the sector or cell ID. The current trip ends when the access terminal determines (at 315) that the new cell or sector is a primary cell or sector.

After the access terminal determines (at 315) that it has arrived at another primary cell, one trip for travel pattern j is completed. The travel pattern j associated with the original and target primary cell pair is determined and associated (at 320) with the completed trip and the trip counter for travel pattern j (N_trip_pattern_j) is incremented (at 325) by 1. Cell counters associated with the cells visited during the completed trip may also be incremented (at 330). For example, counters (N_cell_i_pattern_j) associated with the cells or sectors encountered by the access terminal that are already present in travel pattern j may be incremented (at 330) by 1. Values of the counters (N_cell_i_pattern_j) associated with the cells that have not been encountered by the access terminal during previous trips associated with the travel pattern j may also be initialized (at 330). For example, if the current value of the parameter N_trip_pattern_j<=100, the corresponding encountered counters, N_cell_i_pattern_j, for i=1, 2, . . . , m, may be set (at 330) to 1. However, if N_trip_pattern_j>100, the corresponding encountered cell's counters, N_cell_i_pattern_j, for i=1, 2, . . . , m, may be set (at 330) to N_trip_pattern_j×Correlation_thresh. The access terminal may then store all (m+k) the encountered cells counters N_cell_i_pattern_j.

The correlation metric for the cells encountered during the trip may then be calculated (at 335). In the illustrated embodiment, the correlation metric is calculated (at 335) using the relationship:
Correlation_cell_i_pattern_j=N_cell_i_pattern_j÷N_trip_pattern_j, i=1, 2, . . . , m+k. Once the correlation metric has been calculated (at 335) then, in one embodiment, the value of the parameter N_trip_pattern_j may be reset. For example, if N_trip_pattern_j>Max_mum_trips, the value of may be reset so that N_trip_pattern_j=100 and N_cell_i_pattern_j=100× Correlation_cell_i_pattern_j, for i=1, 2, . . . k+m. However, persons of ordinary skill in the art having benefit of the present disclosure should appreciate that resetting the value of the parameter N_trip_pattern_j in the manner described above is optional and may be omitted or modified in alternative embodiments.

The value of the correlation metric for each cell or sector in the travel pattern (Correlation_cell_i_pattern_j) may then be compared (at 340) to a threshold value, Correlation_cell_i_pattern_j. The associated cell or sector may be added (at 345) to the travel pattern if the comparison indicates that Correlation_cell_i_pattern_j>Correlation_thresh. Alternatively, if the cell or sector is already included in the travel pattern, then the cell or sector may be retained (at 345) in the travel pattern. However, the cell or sector may be removed (at 350) from the travel pattern, or not added to the travel pattern, if the comparison indicates that Correlation_cell_i_pattern_j<=Correlation_thresh. In one embodiment, the cell or sector may be removed (at 350) from the travel pattern if Correlation_cell_i_pattern_j<=Correlation_thresh over a selected number of trips. For example, counting from the first trip that a cell's Correlation_cell_i_pattern_j<=Correlation_thresh, if over next 1/Correlation_thresh trips this cell's correlation metric meets the condition Correlation_cell_i_pattern_j<Correlation_thresh, this cell (and its associated counters and metrics) may be removed from the travel pattern j.

In one embodiment, the travel patterns or dynamic sector list determined by the access terminal may be transmitted to the access network. For example, if N_trip_pattern_j>Pattern_maturity_thresh, the access terminal may transmit an update of the travel pattern j to the associated access network. After the initial pattern update, changes to the travel pattern j may be provided to the access network by providing information indicating the cell IDs that are to be added or removed from the travel pattern or dynamic sector list maintained at the access network. For example, the access terminal may update a list of IDs of the preferred cells/sectors for the access network to page with messages. The nature of the list or group of the cells/sectors could be indicated in the message header. For example, the header may indicate whether the sector list information is for a stationary or dynamic route pattern. In addition to the sector IDs, the intermediate statistic information with each sector ID could also be updated from the access terminal to the access network.

The access terminal and the access network may also negotiate various parameters that may be used to determine the travel patterns or dynamic sector lists. For example, the access network could negotiate the following parameters to the access terminal via attributes:
  Short_update_period
  Short_term_stationary_duration_threshold
  Long_term_avg_period
  Stationary_pattern_threshold
  Drop_threshold
  Correlation_thresh
  Max_mum_trips
  Pattern_maturity_thresh The dynamic travel route pattern training algorithms may have various options that may be determined by the negotiated parameters. For example, the parameter Correlation_thresh may be pre-determined at the access network and provided to or negotiated with the access terminal. This parameter represents a likelihood of approximately Correlation_thresh that an access terminal will encounter the cell i when the access terminal travels on the route of pattern j. The correlation metric Correlation_cell_i_pattern_j is the fundamental criterion for building up the dynamic travel route pattern. With the Correlation_thresh being determined at the access network and specified to the access terminal, the quality of the dynamic travel pattern is produced by the access terminal may be under control regardless the algorithm the access terminal is using. For another example, the access terminal may determine the sector ID list update timing based on the attributes specified by the access network.

Figure 4:
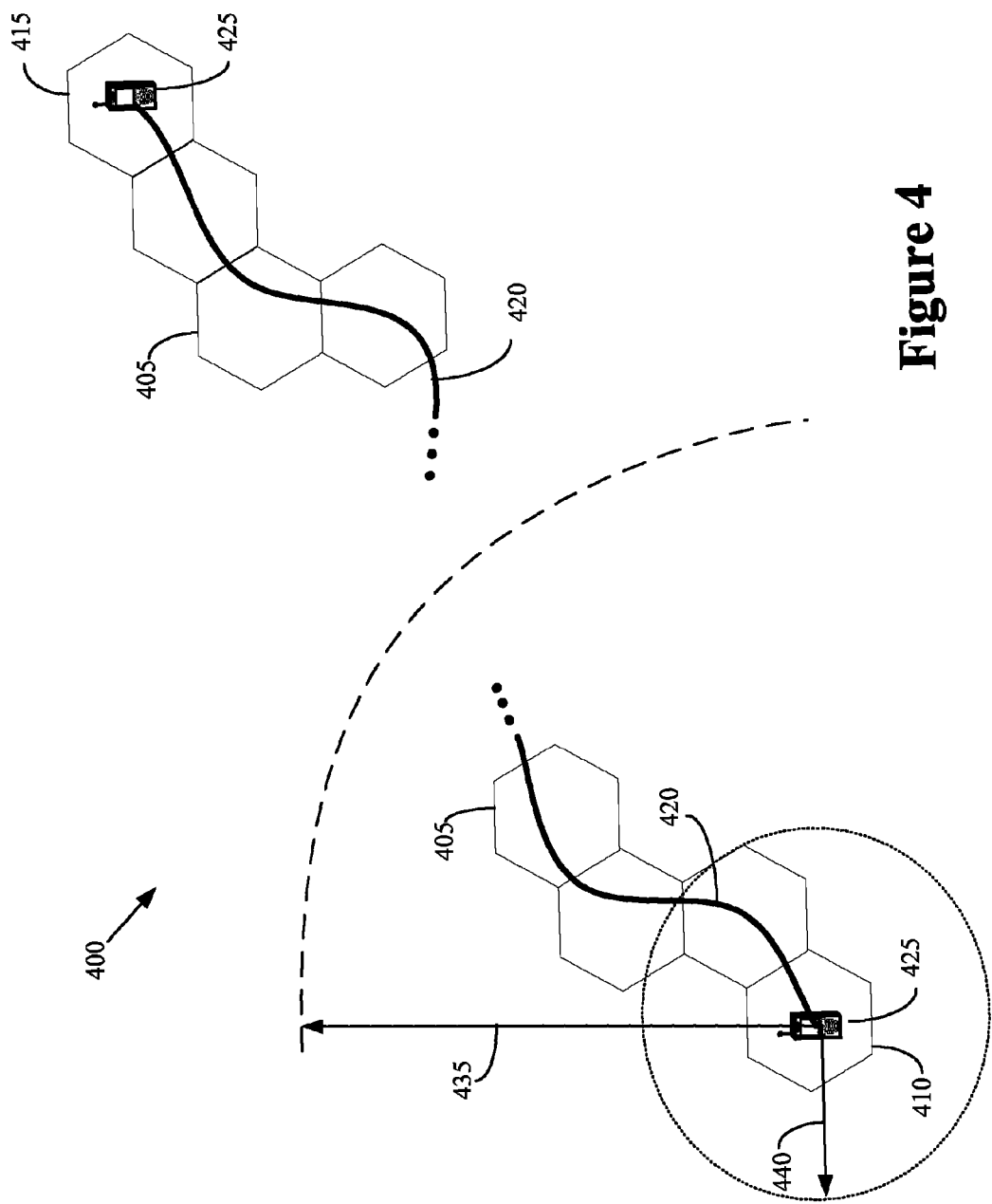
FIG. 4 conceptually illustrates a second exemplary embodiment of a wireless communication system, in accordance with one embodiment of the present invention.

FIG. 4 conceptually illustrates a second exemplary embodiment of a wireless communication system 400. In the second exemplary embodiment, the wireless communication system 400 is configured to provide wireless connectivity to a plurality of geographic areas or cells 405 that include two primary cells 410, 415. For example, the primary cell 410 may provide wireless connectivity to a geographical area including a user's home and the primary cell 415 may provide wireless connectivity to a geographical area including the user's workplace. The cells 405 lie along a route 420 that corresponds to the user's commuting route from home to work and from work back to home. The user typically carries an access terminal 425 while commuting from home to work (and back) and so the access terminal 425 is able, over the course of time, to determine that the cells 405 that lie along the route 420 are part of a travel pattern. Information indicative of the travel pattern may be stored in the access terminal 425 and/or one or more access networks (not shown) associated with the cells 405, 410, 415.

When the user leaves the primary cell 410 and enters one of the cells 405 associated with the travel pattern, the access terminal 425 may determine that the cell 405 is associated with the travel pattern. The access terminal 425 may provide a route update message in response to leaving the primary cell 410. Information included in the route update message may indicate to the wireless communication system 400 that the access terminal 425 is most likely to be found in cells 405 associated with the travel pattern. In another embodiment, the access network may use the ID of the sector that received the last route update message from the access terminal 425 to determine the "last seen" sector of the access terminal 425. The access network could then determine whether the access terminal 425 is traveling along a route pattern based on the travel route pattern sector list stored in the access network, without using further information (for example the pattern group ID in RUM) provided by the access terminal 425. If information destined for the access terminal 425 is received by the wireless communication system 400, then a paging message may be transmitted via the cells 405 in the travel pattern.

In one embodiment, based on the last route update message received, the access network determines that the access terminal 425 is not traveling along a route pattern. If information destined for the access terminal 425 is received by the wireless communication system 400, then a paging message may be transmitted via the cells 405 listed in the stationary pattern before it pages all the cells (or sectors) in the normal radius. The cells listed in the stationary pattern within the normal radius or an enlarged radius could be paged.

In some cases, the number of cells 405 in the travel pattern may be large. For example, the user may commute a relatively long distance through densely populated areas and so may pass through a relatively large number of cells 405 when traveling between the primary cell 410 and the primary cell 415. Thus, in some embodiments, the access terminal 425 may also use a distance traveled from one or more of the cells 405 to trigger transmission of a route update message. For example, the access terminal 425 may transmit the route update message when it has traveled a distance greater than the radius 435 from the primary cell 410, even though the access terminal 425 may still be traveling in cells 405 associated with the travel pattern. In one embodiment, the radius 435 may be selected to be larger than a radius 440 that is used for radius-based paging techniques when the access terminal 425 is not traveling along a known travel pattern. Persons of ordinary skill in the art having benefit of the present disclosure should appreciate that the particular values of the radii 435, 440 are matters of design choice and not material to the present invention.

Figure 5:
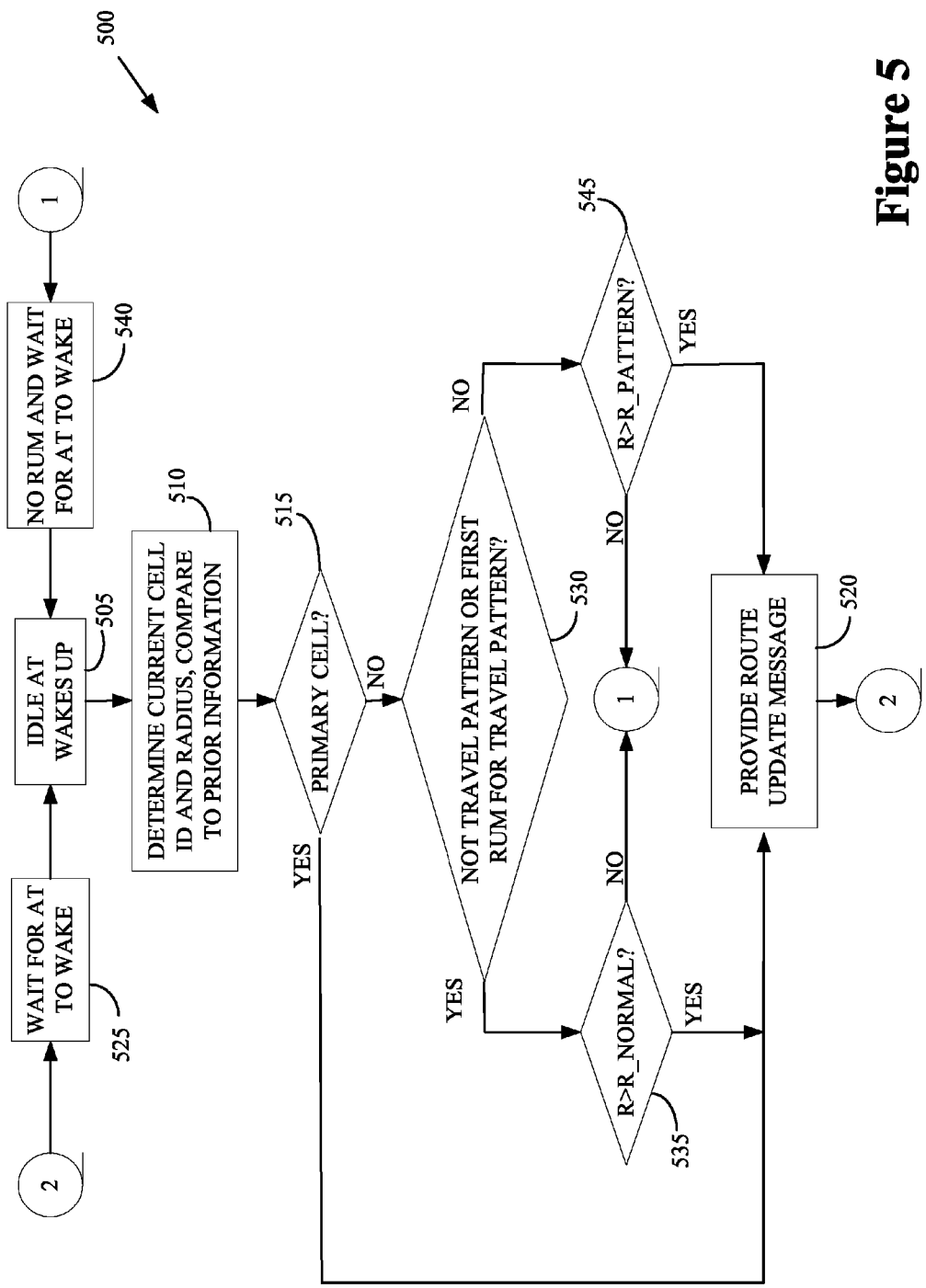
FIG. 5 conceptually illustrates one exemplary embodiment of a method of providing route update messages, in accordance with one embodiment of the present invention.

FIG. 5 conceptually illustrates one exemplary embodiment of a method 500 of providing route update messages. In the illustrated embodiment, an access terminal has determined one or more cell or sector lists, such as travel patterns that include at least one primary cell. The cell or sector lists may also be stored in an access network, as discussed above. In another embodiment, the access network may also use the ID of the last sector "heard" or associated with the access terminal when the last route update message is received from the access terminal to determine the "last seen" sector of the access terminal. Then based on the travel route pattern sectors list stored in the access network, the access network could determine whether the access terminal is traveling along a route pattern without being instructed by the access terminal. The access terminal may have provided a previous route update message prior to entering the idle mode while in a cell or sector that will be referred to as the last-route update message cell. In one embodiment, the access terminal sends a Route Update Message (RUM) right after it enters the idle state. The RUM may include information such as reference cell/sector location information (i.e. the sector ID) that may be used for further radius calculation, as discussed above. By providing the RUM before entering the idle state, the access terminal and the access network may be able to reconcile different views of the cell of the access terminal last seen when the access terminal changed from the connected state to the idle state. In addition, to support the diversity selection/combine of the RL access channel and to combat link imbalance, the reference sector ID for radius calculation of an access terminal may be included in the RUM every time a RUM sent by the access terminal In the illustrated embodiment, the access terminal is in an idle mode and then the idle access terminal wakes up (at 505). The access terminal may then determine (at 510) an identifier associated with the current cell and a radius from the current cell to the last-RUM cell. For example, the access terminal may receive a cell identifier by monitoring a broadcast channel and may use the identity of the cell to determine the radius from the current cell to the last-RUM cell. The access terminal may also compare (at 510) the current cell identifier and/or the radius to the prior information, e.g., the stored information indicating the primary cells and/or the travel patterns associated with the access terminal.

If the access terminal determines (at 515) that the current cell is a primary cell, then the access terminal may provide (at 520) a route update message. The route update message may include information identifying the primary cell as the current travel pattern and/or a default paging area. Once the route update message has been provided (at 520), the route update algorithm may wait (at 525) for the next time that the idle access terminal awakes. If the access terminal determines (at 515) that the current cell is not a primary cell, then the access terminal may determine (at 530) whether or not the current cell is a part of a known travel pattern. If the current cell is a part of a known travel pattern, the access terminal may also determine (at 530) whether or not a RUM for the known travel pattern was sent before. For example, the access terminal may compare the current cell (as well as other visited cells) to the cells in known travel patterns and may determine (at 530) whether or not the cells are likely to be part of one of the known travel patterns.

If the access terminal determines (at 530) that the current cell is not a part of a travel pattern, or if the current cell is part of a known travel pattern but no previous RUM has been transmitted for this pattern, then the access terminal may determine (at 535) whether or not the current radius from the last-RUM cell is larger than the radius (R_NORMAL) used in a conventional location-based paging scheme to determine whether or not to transmit a route update message. If the current radius is larger than R_NORMAL, then a route update message may be provided (at 520) and the algorithm may wait (at 525) for the next time the access terminal awakes. If the current radius is smaller than R_NORMAL, the access terminal does not transmit the route update message and simply waits (at 540) for the access terminal to awaken again.

In the illustrated embodiment, if the access terminal determines (at 530) that the current cell is a part of a travel pattern, then the access terminal may determine (at 545) whether or not the current radius from the last-RUM cell is larger than a radius (R_PATTERN) that is determined for the travel pattern and is larger than R_NORMAL. However, persons of ordinary skill in the art having benefit of the present disclosure should appreciate that the step of determining (at 545) whether or not the current radius from the last-RUM cell is larger than R_PATTERN is optional and not necessary for the practice of the present invention. If the current radius is larger than R_PATTERN, then a route update message may be provided (at 520) and the algorithm may wait (at 525) for the next time the access terminal awakes. If the current radius is smaller than R_PATTERN, the access terminal does not transmit the route update message and simply waits (at 540) for the access terminal to awaken again.

Figure 6:
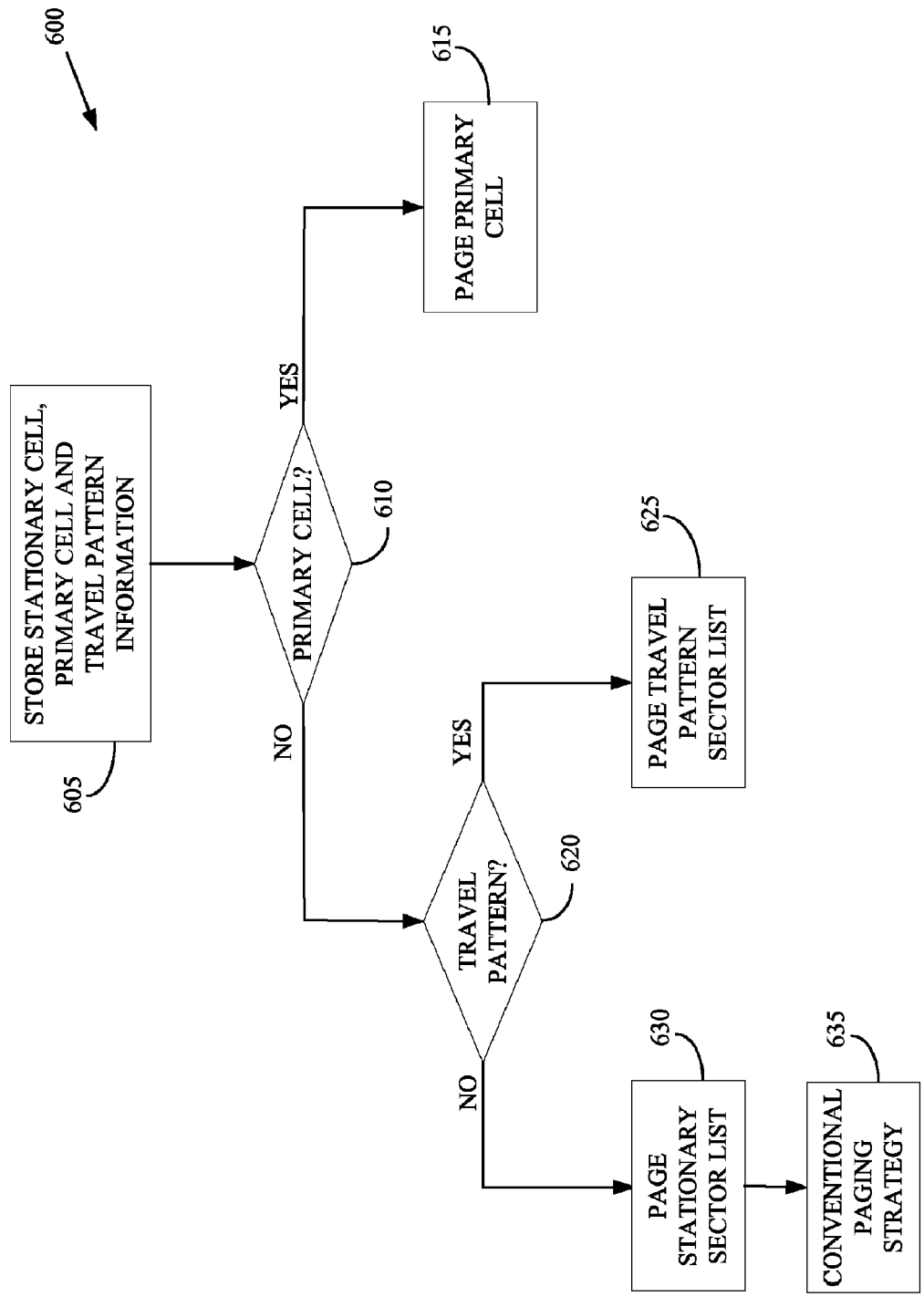
FIG. 6 conceptually illustrates one exemplary embodiment of a method for paging access terminals based upon prior information associated with the access terminals, in accordance with one embodiment of the present invention.

FIG. 6 conceptually illustrates one exemplary embodiment of a method 600 for paging access terminals based upon prior information associated with the access terminals. In the illustrated embodiment, an access network stores (at 605) prior information associated with the access terminals that indicates stationary cells, primary cells, and/or travel patterns associated with the access terminals. As discussed above, this information may be provided by the access terminals and may be stored in a database that is accessible to the access network. If the access network wants to page the access terminal, the access network determines (at 610) whether or not the last-RUM cell for the access terminal was a primary cell. If the last-RUM cell is a primary cell, then the access network may page (at 615) the primary cell. If the last-RUM cell was not a primary cell, then the access network may determine (at 620) whether or not the last-RUM cell was a part of a travel pattern or a stationary cell list associated with the access terminal.

If the last-RUM cell is part of a travel pattern associated with the access terminal, then the access network may page (at 625) the cells that are part of the travel pattern. If the last-RUM cell was not part of one of the travel patterns associated with the access terminal, then the access network may page (at 630) the cells that are part of the stationary cell list associated with the access terminal. If this page fails to locate the access terminal, the then access network may page (at 635) the access terminal using a conventional paging strategy, e.g., the access network may page a group of cells that are proximate to the last-RUM cell.

Also the embodiment of the method 600 described herein described transmission of paging messages based upon stationary cell lists, primary cell lists, and/or travel patterns, this location information and/or user behavior statistics including lists of cells/sectors could be used for other applications. For example, the information may be used to support unicast or multicast short messaging for the access terminals that are in the idle state. Specifically, the short message could be send only to the cells in which the access terminal is expected to be located. For example, the information may be used to support the location based applications, such as transmission of location based advertisement contents to the list of cells associated with the access terminal's dynamic route pattern and/or stationary pattern.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
   providing at least one route update message based upon at least one sector list associated with an access terminal, said at least one sector list being formed based on information collected by the access terminal while the access terminal is in an idle state, wherein said information comprises a time spent in at least one sector by the access terminal and wherein forming said at least one sector list comprises:
      adding said at least one sector to said at least one sector list indicating a stationary pattern of sectors when the time spent in said at least one sector exceeds a first threshold; and
      removing said at least one sector from said at least one sector list indicating the stationary pattern of sectors when the time spent in said at least one sector is below a second threshold.

2. The method of claim 1, comprising:
   collecting, at the access terminal, said information indicative of said at least one sector in response to the access terminal visiting said at least one sector; and
   forming said at least one sector list based on the collected information.

3. The method of claim 2, wherein the collecting information indicative of said at least one sector comprises determining the time spent in said at least one sector by the access terminal, the method further comprising selecting at least one of said at least one sector based upon the time spent in said at least one sector during at least one first time period.

4. The method of claim 1, comprising indicating said at least one sector list to an access network.

5. The method of claim 4, wherein providing the information indicative of said at least one sector list to the access network comprises providing intermediate statistical information associated with said at least one sector to the access network.

6. The method of claim 1, comprising:
   negotiating, between the access terminal and at least one access network, at least one of criteria used to form said at least one sector list and criteria for determining when said at least one sector list is to be indicated to an access network.

7. The method of claim 1, wherein providing said at least one route update message comprises providing said at least one route update message in response to the access terminal entering at least one cell not included in said at least one sector list.

8. The method of claim 1, wherein providing said at least one route update message comprises providing said at least one route update message in response to the access terminal entering the idle state.

9. The method of claim 1, wherein providing said at least one route update message comprises providing said at least one route update message containing a sector ID of a "last seen" sector, the sector ID being indicative of a reference sector used to calculate a route update radius for the access terminal and an access network.

10. The method of claim 1, comprising receiving at least one message transmitted to cells associated with said at least one sector list, said at least one message comprising at least one of location-based information or service, a paging message, a broadcast message, a unicast message, and a multicast message.

11. A method, comprising:
   collecting, at the access terminal, information indicative of at least one sector visited by the access terminal while the access terminal is in an idle state, wherein collecting said information indicative of said at least one sector visited by the access terminal comprises determining a time spent in said at least one sector by the access terminal, the method further comprising selecting at least one selected sector from said at least one sector based upon the time spent in said at least one sector during at least one first time period,
   forming at least one sector list based on the collected information;
   providing at least one route update message based upon said at least one sector list associated with the access terminal, wherein said information comprises the time spent in said at least one sector by the access terminal and wherein forming said at least one sector list comprises:
      adding said at least one sector to said at least one sector list indicating a stationary pattern of sectors when the time spent in said at least one sector exceeds a first threshold; and
      removing said at least one sector from the sector list indicating the stationary pattern of sectors when the time spent in said at least one sector is below a second threshold;
   determining a likelihood associated with said at least one selected sector by filtering a ratio of the time spent in said at least one selected sector to the at least one first time period over a second time period;

adding said at least one selected sector to a sector list indicating the stationary pattern of sectors when the likelihood exceeds the first threshold; and removing said at least one sector from the sector list indicating the stationary pattern of sectors when the likelihood is below the second threshold.

12. The method of claim 11, wherein determining the likelihood comprises determining the likelihood at the access terminal or an access network.

13. A method, comprising:

providing at least one route update message based upon at least one sector list associated with an access terminal, said at least one sector list being formed based on information collected by the access terminal while the access terminal is in an idle state and wherein collecting information indicative of said at least one sector visited by the access terminal comprises:

identifying first and second primary sectors associated with the access terminal; and determining a number of trips taken by the access terminal between the first and second primary sectors; and determining a number of appearances by the access terminal in each sector encountered by the access terminal during trips between the first and second primary sectors.

14. The method of claim 13 comprising determining said at least one sector list by determining a correlation of each of said at least one sector encountered by the access terminal during the trips between the first and second primary sectors with a travel pattern of sectors based upon the number of trips taken by the access terminal and the number of appearances of the access terminal in each sector encountered by the access terminal.

15. The method of claim 14, comprising adding a sector to a sector list indicating the travel pattern if the correlation exceeds a threshold determined by an access network.

16. A method, comprising:

providing at least one route update message based upon at least one sector list associated with an access terminal, said at least one sector list being formed based on information collected by the access terminal, while the access terminal is in an idle state, wherein said information comprises a time spent in at least one sector by the access terminal and wherein forming said at least one sector list comprises:

adding said at least one sector to said at least one sector list indicating a stationary pattern of sectors when the time spent in said at least one sector exceeds a first threshold; and removing said at least one sector from said at least one sector list indicating the stationary pattern of sectors when the time spent in said at least one sector is below a second threshold and wherein providing said at least one route update message comprises providing said at least one route update message containing a sector ID of a "last seen" sector, the sector ID being indicative of a reference sector used to calculate a route update radius for the access terminal and an access network, and wherein the sector ID in the route update message is used by the access network to resolve discrepancies between the "last seen" sector stored in the access terminal and the "last seen" sector stored in the access network, the sector ID of the "last seen" sector being usable by the access network to determine whether the access terminal is traveling along a travel pattern and to support access channel diversity combining.

17. A method, comprising:

receiving information indicative of at least one sector list formed by an access terminal, said at least one sector list being formed based on information collected by the access terminal while the access terminal is in an idle state, wherein said information comprises a time spent in at least one sector by the access terminal and wherein forming said at least one sector list comprises:

adding said at least one sector to said at least one sector list indicating a stationary pattern of sectors when the time spent in said at least one sector exceeds a first threshold; and removing said at least one sector from said at least one sector list indicating the stationary pattern of sectors when the time spent in said at least one sector is below a second threshold.

18. The method of claim 17, wherein receiving the information indicative of said at least one sector list comprises receiving an indication of at least one of the stationary pattern and a travel pattern.

19. The method of claim 18, wherein receiving the information indicative of said at least one sector list comprises receiving the indication of at least one of said at least one sector that is selected based upon the time spent by the access terminal in said at least one sector during at least one first time period.

20. The method of claim 17, wherein receiving the information indicative of said at least one sector list comprises receiving intermediate statistical information associated with said at least one sector.

21. The method of claim 17, comprising:

negotiating, between the access terminal and at least one access network, at least one of criteria used to form said at least one sector list and criteria for determining when said information indicative of said at least one sector list is to be provided to said at least one access network.

22. The method of claim 17, comprising receiving, from the access terminal, at least one route update message based upon said at least one sector list associated with the access terminal and providing at least one message destined for the access terminal to said at least one sector associated with said at least one sector list, wherein providing said at least one message comprises providing at least one of location-based information or service, a paging message, a broadcast message, a unicast message, and a multicast message.

23. The method of claim 22, wherein providing the location-based information or service comprises selecting service content for the location-based information or service.

24. A method, comprising:

receiving information indicative of at least one sector list formed by an access terminal, said at least one sector list being formed based on information collected by the access terminal while the access terminal is in an idle state, wherein said information comprises a time spent in at least one sector by the access terminal and wherein forming said at least one sector list comprises:

adding said at least one sector to said at least one sector list indicating a stationary pattern of sectors when the time spent in said at least one sector exceeds a first threshold; and removing said at least one sector from said at least one sector list indicating the stationary pattern of sectors when the time spent in said at least one sector is below a second threshold, and wherein receiving the information indicative of said at least one sector list comprises the receiving information indicative of at least one of the stationary pattern and a travel pattern, and wherein receiving the information indicative of said at least one sector list comprises receiving the information indicative of said at least one sector selected based upon the time spent by the access terminal in said at least one sector during at least one first time period;

determining a likelihood associated with said at least one selected sector by filtering a ratio of the time spent in said at least one selected sector to the at least one first time period over a second time period;

adding said at least one selected sector to a sector list indicating the stationary pattern of sectors when the likelihood exceeds the first threshold; and removing said at least one sector from the sector list indicating the stationary pattern of sectors when the likelihood is below the second threshold.

* * * * *